(12) United States Patent
Robinson et al.

(10) Patent No.: US 10,721,521 B1
(45) Date of Patent: Jul. 21, 2020

(54) DETERMINATION OF SPATIALIZED VIRTUAL ACOUSTIC SCENES FROM LEGACY AUDIOVISUAL MEDIA

(71) Applicant: Facebook Technologies, LLC, Menlo Park, CA (US)

(72) Inventors: Philip Robinson, Seattle, WA (US); Sebastiá Vicenç Amengual Gari, Seattle, WA (US); Andrew Lovitt, Redmond, WA (US); Carl Schissler, Redmond, WA (US); Peter Henry Maresh, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/450,688

(22) Filed: Jun. 24, 2019

(51) Int. Cl.
| | |
|---|---|
| *H04N 21/439* | (2011.01) |
| *H04S 7/00* | (2006.01) |
| *H04R 5/04* | (2006.01) |
| *H04R 5/033* | (2006.01) |
| *G10L 21/0208* | (2013.01) |
| *G06F 3/01* | (2006.01) |
| *H04R 3/04* | (2006.01) |

(52) U.S. Cl.
CPC ......... *H04N 21/4394* (2013.01); *G06F 3/012* (2013.01); *G06F 3/017* (2013.01); *G10L 21/0208* (2013.01); *H04R 3/04* (2013.01); *H04R 5/033* (2013.01); *H04R 5/04* (2013.01); *H04S 7/303* (2013.01); *G10L 2021/02082* (2013.01)

(58) Field of Classification Search
CPC ..... H04N 21/4394; G06F 3/012; G06F 3/017; G10L 21/0208; G10L 2021/02082; H04R 3/04; H04R 5/033; H04R 5/04; H04S 7/303
See application file for complete search history.

(56) References Cited

U.S. PATENT DOCUMENTS

| | | | | |
|---|---|---|---|---|
| 2012/0093320 A1* | 4/2012 | Flaks | ....................... | H04S 7/301 381/17 |
| 2019/0208351 A1* | 7/2019 | Lyren | ....................... | H04S 7/304 |
| 2019/0387352 A1* | 12/2019 | Jot | ......................... | G10K 15/10 |

* cited by examiner

*Primary Examiner* — Andrew L Sniezek
(74) *Attorney, Agent, or Firm* — Fenwick & West LLP

(57) ABSTRACT

An audio system generates virtual acoustic environments with three-dimensional (3-D) sound from legacy video with two-dimensional (2-D) sound. The system relocates sound sources within the video from 2-D to into a 3-D geometry to create an immersive 3-D virtual scene of the video that can be viewed using a headset. Accordingly, an audio processing system obtains a video that includes flat mono or stereo audio being generated by one or more sources in the video. The system isolates the audio from each source by segmenting the individual audio sources. Reverberation is removed from the audio from each source to obtain each source's direct sound component. The direct sound component is then re-spatialized to the 3-D local area of the video to generate the 3-D audio based on acoustic characteristics obtained for the local area in the video.

20 Claims, 11 Drawing Sheets

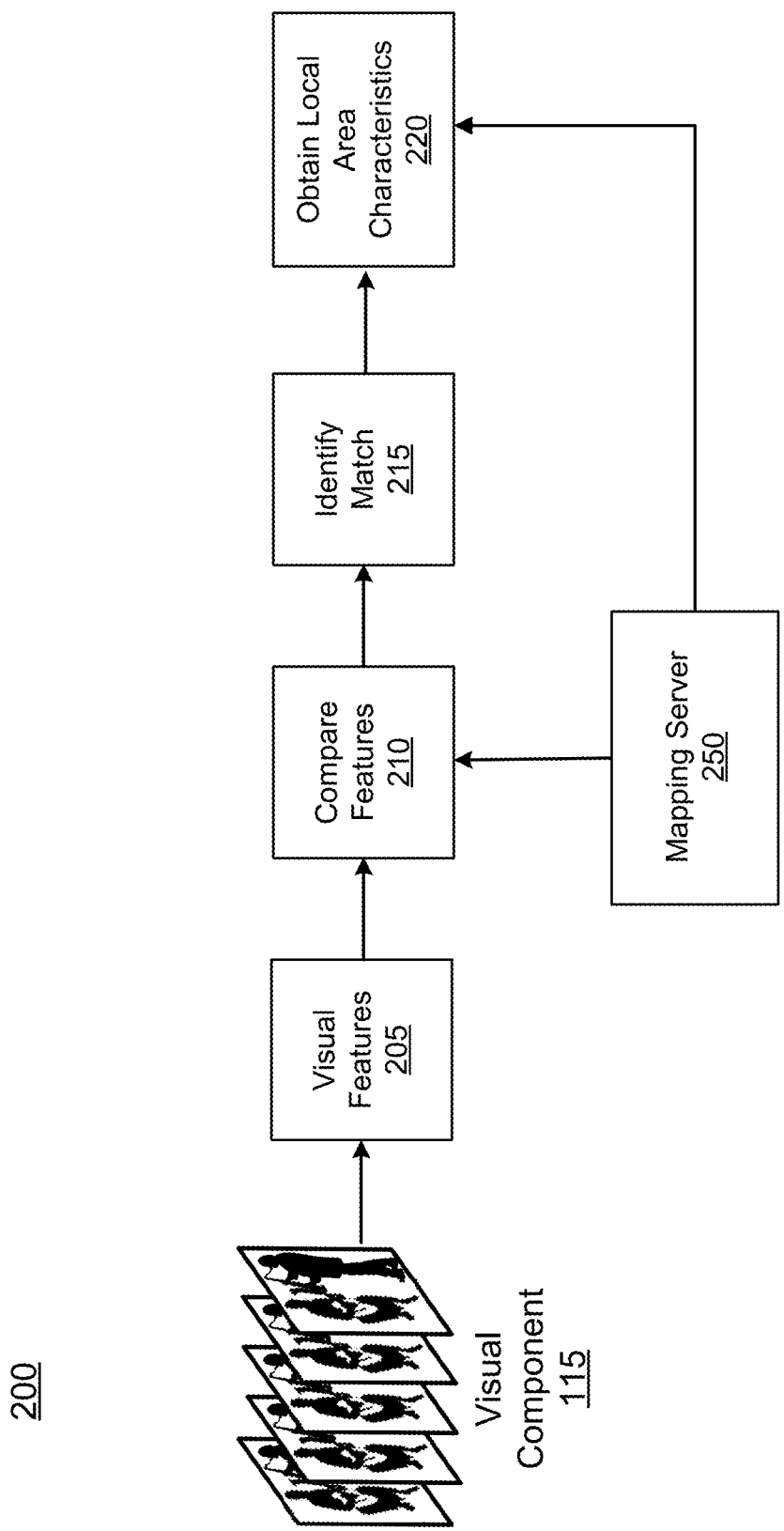

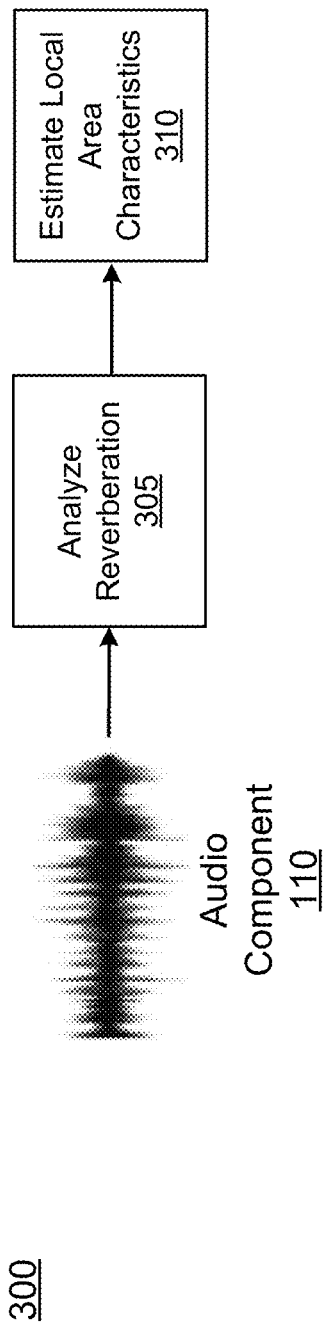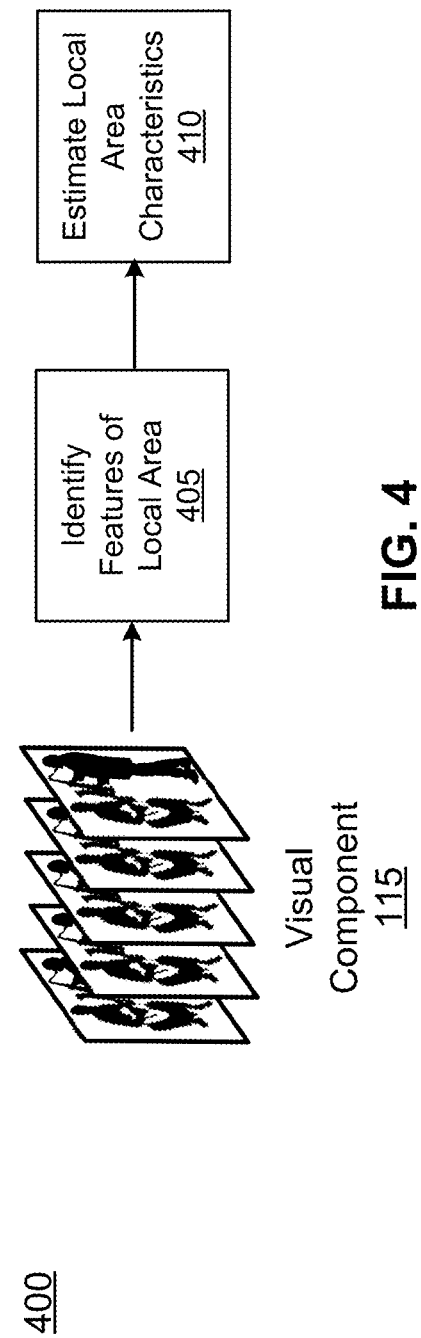

600

```
┌─────────────────────────────────────────────────────────────────┐
│ Obtain video that includes a visual component and an audio      │
│ component, the audio component including audio from a first     │
│ sound source and a second sound source                          │
│ 605                                                             │
└─────────────────────────────────────────────────────────────────┘
                                  │
                                  ▼
┌─────────────────────────────────────────────────────────────────┐
│ Segment audio into first audio for the first sound source and   │
│ second audio for the second sound source                        │
│ 610                                                             │
└─────────────────────────────────────────────────────────────────┘
                                  │
                                  ▼
┌─────────────────────────────────────────────────────────────────┐
│ Remove reverberation from the first audio and the second audio  │
│ 615                                                             │
└─────────────────────────────────────────────────────────────────┘
                                  │
                                  ▼
┌─────────────────────────────────────────────────────────────────┐
│ Obtain acoustic characteristics of local area presented in the  │
│ video                                                           │
│ 620                                                             │
└─────────────────────────────────────────────────────────────────┘
                                  │
                                  ▼
┌─────────────────────────────────────────────────────────────────┐
│ Generate 3-D audio for video from the first and second audio    │
│ using the obtained acoustic characteristics of the local area   │
│ 625                                                             │
└─────────────────────────────────────────────────────────────────┘
```

FIG. 6

DETERMINATION OF SPATIALIZED VIRTUAL ACOUSTIC SCENES FROM LEGACY AUDIOVISUAL MEDIA

BACKGROUND

The present disclosure relates generally to presentation of audio at a headset, and specifically relates to determination of spatialized virtual acoustic scenes from legacy audiovisual media.

Humans are able to determine the location of a sound source by subconsciously comparing the sound perceived at each set of ears. The sound perceived at the ears of two users can be different, depending on a direction and a location of a sound source with respect to each user as well as on the surroundings of a room in which the sound is perceived. However, recordings in environments with acoustically reflective surfaces contain sound reflected from the direction of these reflective surfaces, in addition to the direct sound from the source to the microphone. When these recordings are mixed into mono or stereo, the spatial information contained in the reflections is collapsed and lost. Accordingly, much of the legacy video media that was originally produced for stereo speakers or headphones, does not include full audio spatialization.

SUMMARY

A method for generating virtual acoustic environments with three-dimensional (3-D) audio from legacy video with two-dimensional (2-D) audio (e.g., mono or stereo sound) is disclosed. The method converts 2-D audio from one or more sound sources within a video to 3-D audio. The 3-D audio may be used to create an immersive 3-D virtual scene of the video that can be viewed using a headset. Accordingly, an audio processing system obtains a video that includes 2-D audio being generated by two or more sound sources in the video. The system isolates the audio from each sound source by segmenting the individual sound sources using a source separation technique. Reverberation (e.g., the reflected sound) accompanying the audio is removed from the audio from each source in the video to obtain each source's direct sound component. The direct sound component is then re-spatialized to a local area of the video to generate the 3-D audio.

To re-spatialize each direct sound component, the system obtains acoustic characteristics of the local area associated with the video. The audio processing system may obtain the acoustic characteristics of the local area by 1) comparing visual features of the video to features of spaces stored in a database of a mapping server, 2) analyzing reverberation of the audio to obtain the acoustic characteristics of the local area, 3) analyzing visual features of video to estimate the acoustic characteristics of the local area, and 4) a combination of analyzing the reverberation and analyzing visual features to estimate the acoustic characteristics of the local area.

Accordingly, the audio processing system generates a local area impulse response for each sound source so that the audio matches the acoustic characteristics of the local area captured in the video. This allows sound of the video to appear as if it is originating from each of the actual sound sources in the local area. Moreover, the local area impulse response may also take the user's position in the room and/or the user's position relative to the sound sources in the local area. For example, the audio processing system may obtain data for the position and/or orientation of a headset worn by a user that corresponds to a perspective of the user within the video, such as where the user is looking within a virtual scene. The audio processing system may then adjust the local area impulse response for each sound source based on the position or orientation of the headset and the acoustic characteristics of the local area captured in the video. Thus, as the user turns their head to look away from a sound source, the sound will continue to be perceived by the user wearing the headset that the sound is coming from the direction of the source in the video.

BRIEF DESCRIPTION OF THE DRAWINGS

FIG. 2 is a flow diagram for obtaining local area acoustic characteristics, in accordance with one or more embodiments.

FIG. 3 is a flow diagram for obtaining local area acoustic characteristics, in accordance with one or more embodiments.

FIG. 4 is a flow diagram for estimating local area acoustic characteristics from video, in accordance with one or more embodiments.

FIG. 6 is a flowchart illustrating a process for deriving spatialized acoustic data from legacy audiovisual media, in accordance with one or more embodiments.

Figure 1:
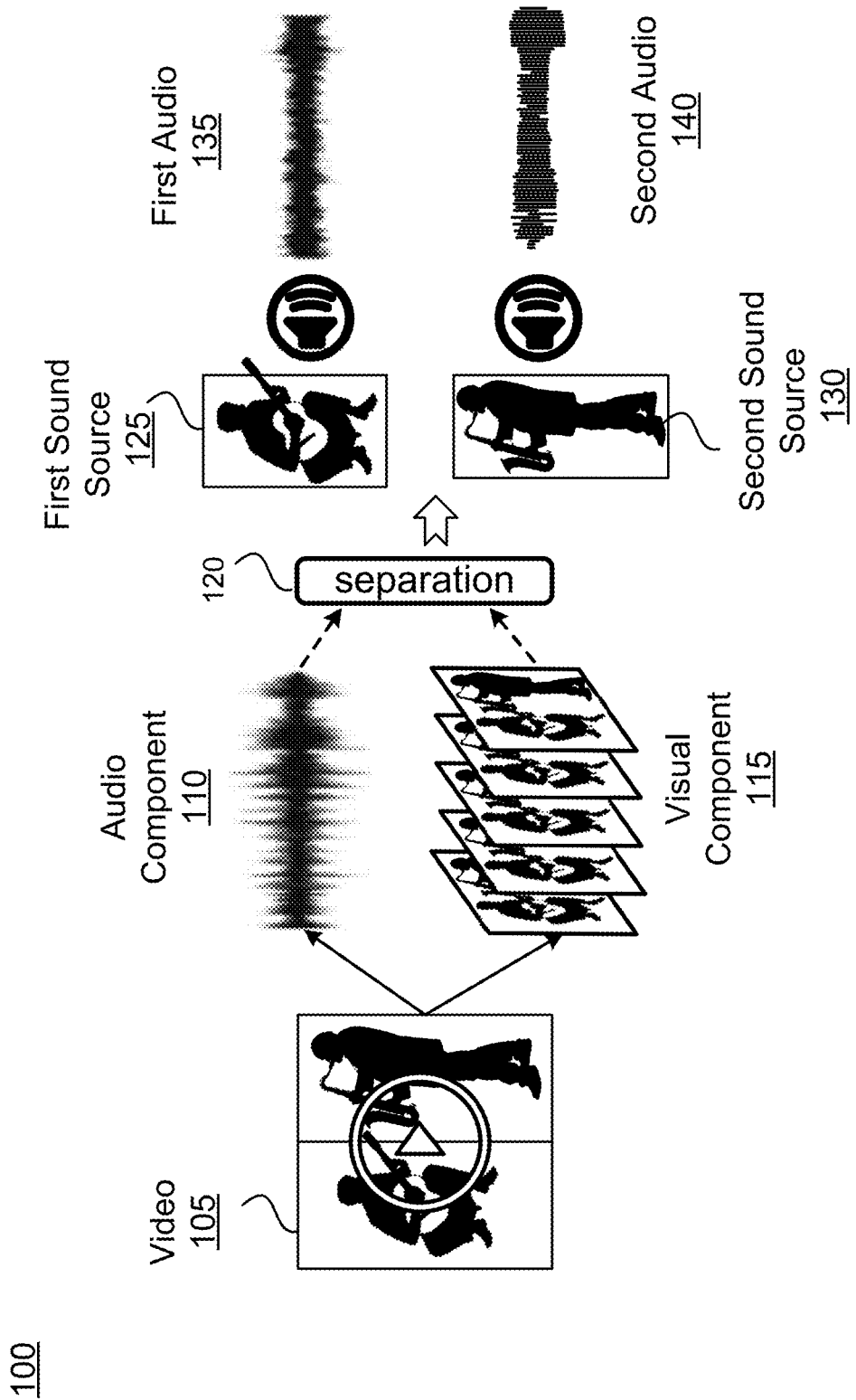
FIG. 1 is a flow diagram for audio source separation, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

A large amount of legacy video media (e.g., cinematic movies, TV shows, YOUTUBE video, etc.) does not include audio spatialization. Audio spatialization is audio that has been processed to give the listener the impression of a sound source within a virtual 3-D environment. Audio spatialization contributes to a sense of immersion for artificial reality system, suggesting to the user that they are in an actual 3-D environment. Recently it has become possible to analyze these legacy videos using machine learning methods and separate the individual audio sources. This allows for many possibilities, such as listening to only one sound source in a video and/or re-mixing a musical ensemble with some or all of the individual instrument tracks. Additionally, in conjunction with a mapping server that crowd sources and stores spatial and/or acoustic properties of spaces, the audio sources can be relocated into 3-D geometry to create an exploitable, immersive 3-D artificial reality scene derived from a legacy recording.

An audio processing system and method for deriving spatialized acoustic data from legacy audiovisual media (e.g., 2-D video file) is described. The system and method apply signal processing techniques while, in some embodiments, leveraging information from a mapping server to create virtual acoustic environments from legacy video with audio. The system achieves this by isolating sound from each sound source in audiovisual media to obtain a direct sound component for each sound source (e.g., by applying one or more de-reverberation techniques). The system may use location information associated with the media file and a mapping server, and/or the media audiovisual media to re-localize the audio source into the 3-D geometry of a local area pictured in the video. The system, in one embodiment, performs an acoustic simulation to obtain a local area impulse response for each audio source using the 3-D geometry of the local area. The system may provide the local area impulse response to an artificial reality headset that uses the local area impulse response to present spatialized audio content (e.g., within the actual—or virtual representation of—the local area).

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

Source Separation

For a video that includes mono or stereo audio, an audio processing system applies one or more source separation techniques to derive mono tracks for each audio source in the scene. FIG. 1 is a flow diagram 100 for audio source separation, in accordance with one or more embodiments. In FIG. 1, the audio processing system obtains a video 105 that does not have full audio spatialization (e.g., mono or stereo audio). Accordingly, the audio processing system isolates the audio component 110 from the visual component 115 and, in this example, segments the sound sources within the audio component 110 into the individual sound sources using one or more source separation 120 techniques. In one embodiment, the one or more source separation 120 techniques are existing source separation techniques known to one of skill in the art. For example, a source separation method may leverage a collection of unannotated videos to discover a latent sound representation for each object in the videos. Specifically, image recognition tools can be used to infer the objects present in each video and a non-negative matrix factorization (NMF) can be performed on the audio of each video to recover its set of frequency basis vectors. At this point it is unknown which audio bases go with which visible object(s). To recover the association, a neural network for multi-instance multi-label learning (MIML) that maps audio bases to the distribution of detected visual objects is constructed. From this audio basis-object association network, the audio bases linked to each visual object are extracted, yielding its prototypical spectral patterns. Finally, given a novel video, the learned per-object audio bases can be used to perform audio source separation. Other source separation techniques can also be used.

Referring back to FIG. 1, the video 105 includes two individuals playing music. One individual is playing the guitar and corresponds to a first sound source 120 and the other individual is playing the saxophone and corresponds to a second sound source 125. Accordingly, from the audio component 110 of video 105, the one or more source separation 120 techniques segment the audio component 110 into first audio 135 from the first sound source 120 and second audio 140 from the second sound source 125.

At this point, the first audio 135 includes audio from the first sound source 125 as well as sound from the first sound source 125 that has reflected off walls or other objects in the environment of the video 105. Similarly, the second audio 140 includes audio from the second sound source 130 as well as sound from the second sound source 120 that has reflected off the walls and other objects in the environment. This reflected sound is referred to as reverberation. Depending on the size of the environment, material the floor and walls, and so forth, for example, the acoustic characteristics of the reflected sound can widely vary. When such a recording is mixed into mono or stereo, the spatial information contained in the reflections is collapsed and lost. Thus, after source separation 120, first audio 135 and second audio 140 still contain reflected sound energy, but no directional information about those reflections. As such, spatial immersion is broken, and the separated sources cannot be realistically placed in a 3-D geometry. Thus, the audio processing system removes reverberation from the first audio 135 and the second audio 140 to obtain a direct sound component associated with the first sound source 125 and the second sound source 130. The direct sound component, therefore, originates directly from the sound source (i.e., the direct-sound-only component of the signal) and does not include any reverberation. In one embodiment, removing reverberation from the first audio 130 and the second audio 135 makes use of existing de-reverberation techniques known to one of skill in the art. For example, the reverberation can be cancelled by exploiting a mathematical model of the environment and, after estimation of the acoustic characteristics of the environment, forming an estimate for the original signal. In another example, the reverberation can be suppressed by treating it as a type of noise and performing a de-noising process specifically adapted to reverberation. In another example, the original dereverberated signal can estimated using, for example, a deep neural network machine learning approach or alternatively a multichannel linear filter. In some of these approaches, the dereverberation techniques are based on linear prediction. Other dereverberation techniques and approaches can also be used.

The direct sound component is then re-spatialized to the 3-D local area of the video 105 to generate the 3-D audio. To re-spatialize the direct sound component of the first sound source 120 and the second sound source 125, the audio processing system obtains acoustic characteristics of the local area in the video 105. The acoustic characteristics of the local area in the video 105 can be estimated using visual features of the local area, such as the geometry of the local area, or by analyzing audio features of the local area, such as a reverberation time, sound attenuation, sound absorption, sound diffusion, and so forth associated with the audio component 110, or a combination of both visual and audio features.

The local area is the space or environment surrounding the first sound source 120 and the second sound source 125 in which the sound from the guitar and saxophone reflects, reverberates, or otherwise propagates and the spatial and acoustic characteristics of the local area impact how the sound moves within the space and, therefore, "sounds" to a user or individual within the space. Thus, the local area can be an enclosed space, such as a room, a concert hall, church, and so forth, or the local area can be outside. The characteristics of each of these local areas, the objects in them, and a user's position in the local area and relative to the objects impact how the sound is perceived by the user. Accordingly, the audio processing system obtains characteristics of the local area associated with the video and there are a number of ways in which this information for the local area may be obtained. These include the audio processing system 1) comparing visual features of the visual component 115 of video 105 to features of spaces stored in a database of a mapping server, 2) analyzing reverberation of the audio component 110 to obtain the acoustic characteristics of the local area, 3) analyzing the visual component 115 of video 105 to estimate the acoustic characteristics of the local area, and 4) a combination of analyzing the reverberation and analyzing the visual components 115 to estimate the acoustic characteristics of the local area.

FIG. 2 is a flow diagram 200 for obtaining local area space characteristics, in accordance with one or more embodiments. The audio processing system, in this example, obtains the characteristics for spatializing the audio to the local area by identifying visual features of the local area and comparing those features to a database of features mapped to spaces for which acoustic and/or spatial characteristics are known. In this example, the visual components 115 of the video 105 are analyzed to identify visual features 205 of the local area within the video 105. The visual features 205 are distinguishing visual features that differentiate one space from another that can include a combination of furniture, furniture placement, artwork, artwork location, architectural design, color, and so forth. The audio processing system then compares 210 these identified visual features 205 of the local area to features of real-world spaces stored in a database of a mapping server 250. The mapping server 250, in this embodiment, stores spatial and/or acoustic characteristics of spaces that the mapping server 250 receives from crowd-sourcing acoustic and/or spatial data from users wearing a headset with room/space mapping capabilities. The mapping server 250 is discussed in more detail with respect to FIG. 7. Accordingly, responsive to identifying a match 215 between the visual features 205 of the local area and the features of a real-world space stored in the database of the mapping server 250, the audio processing system obtains 220 the sound and/or space characteristics of that space in order to re-spatializing the direct sound component of the first audio 130 and the second audio 135. In various embodiments, the mapping server 250250 is separate from the audio processing system or is part of the audio processing system.

FIG. 3 is a flow diagram 300 for obtaining local area characteristics, in accordance with one or more embodiments. The audio processing system, in this example, obtains acoustic characteristics of the local area by analyzing reverberation of the audio component 110 for the first audio 130 and the second audio 135. In one embodiment, analyzing the reverberation 305 includes calculating a reverberation time decay using RT60 estimation or another acoustic analysis tool. With the reverberation time decay, the system can reverse engineer the characteristics of the local area and apply these characteristics to the direct sound component of the first audio 130 and the second audio 135. With these characteristics of the local area, the audio processing system re-spatializes the audio to generate the 3-D audio for the video with the direct sound components using the characteristics for the local area determined based on an analysis of the reverberation.

FIG. 4 is a flow diagram 400 for estimating local area characteristics from video, in accordance with one or more embodiments. The system, in this example, obtains characteristics of the local area by analyzing the visual component 115 of video 105 to identify features 405 of the local area that are visible within the video 105. In one embodiment, the features used to estimate the local area characteristics are the same as discussed above with respect to FIG. 2. In other embodiments, these features are more particularly directed to features that would impact sound in the environment. For example, these features can include features used to determine whether the local area is indoors or outdoors, estimate the size of the local area (e.g., room geometry, depth of walls, vergence points of hallways, etc.), identify objects that would impact reverberation in the local area (e.g., carpet, hardwood floors, empty volume, objects in the local area, etc.), and so forth. With these features that the audio processing system identifies in the video 105, the audio processing system estimates the characteristics 410 of the local area. In one embodiment, the audio processing system correlates visual features in videos for which their corresponding acoustic characteristics are known using a machine learning model. The machine learning model may also correlate audio features (e.g., reverberation time, sound attenuation, sound absorption, sound diffusion, etc.) to known acoustic characteristics. Accordingly, the machine learning model maps visual features and, in some embodiments, audio features of known environments in videos to their acoustic characteristics. This allows the audio processing system to estimate the acoustic characteristics of a local area in a new video (i.e., one that is not known to the system) based on the visual features and/or audio features from the new video.

Using the acoustic characteristics, the audio processing system generates a local area impulse response for the first sound source 125 and the second sound source 130 so that the first audio 135 and the second audio 140 match to the acoustic characteristics of the local area captured in the video 105. This allows the sound to appear as if it is originating from the first sound source 125 and the second sound source 130 in the local area even when a user viewing the video 105 through a headset turns their head to look away from the guitarist and saxophonist.

Moreover, the local area impulse response may also take the user's position in the room and/or the user's position relative to the audio sources in the local area and, from the local area impulse response. In order to achieve this, the audio processing system may incorporate head related transfer functions (HRTF) to account for the user's position in the room and/or the user's position relative to the audio sources. HRTFs characterize how an ear of the user receives a sound from a point in space. HRTFs are described in detail in U.S. patent application Ser. No. 16/390,918, filed Apr. 22, 2019, which is incorporated herein by reference in its entirety. For example, the system may obtain data for the position and/or orientation of the headset worn by a user that corresponds to a perspective of the user within the video, such as where the user is looking within the video. The system may then adjust the local area impulse response for each audio source based on the position or orientation of the headset and the sound characteristics or space characteristics of the local area captured in the video. In one embodiment, this includes utilizing binaural synthesis techniques to interactively convolve each spatial room impulse response with the appropriate mono track, based on listener position and orientation within the virtual scene. Thus, as the user turns their head to look away from the guitarist and saxophonist, the sound will continue to be perceived by the user wearing the headset that the sound is coming from the direction of them in the video 105.

Audio Processing System

Figure 5:
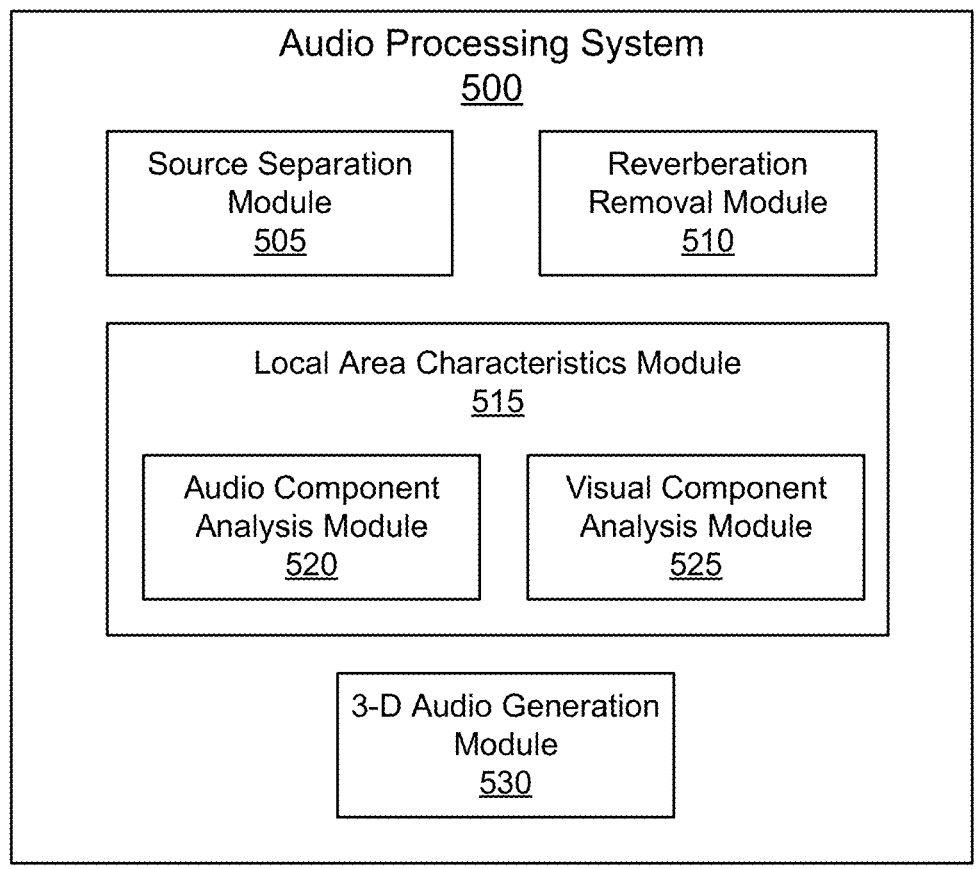
FIG. 5 is a block diagram of an audio processing system, in accordance with one or more embodiments.

FIG. 5 is a block diagram of an audio processing system 500, in accordance with one or more embodiments. With the emergence of artificial reality (e.g., virtual reality, augmented reality, etc.), these legacy videos that include old movies can now be viewed by user wearing a head mounted display. However, these older movies include 2-D audio that was originally produced for stereo speakers or headphones and, therefore, do not include full audio spatialization. Thus, the audio processing system obtains 2-D legacy videos and derives the spatialized acoustic data in order to generate 3-D audio for these legacy videos. The audio processing system 500 includes a source separation module 505, a reverberation removal module 510, a local area characteristics module 515, and a 3-D audio generation module 530. The local area characteristics module 515 further includes an audio analysis module 520 and a visual component analysis module 525. In other embodiments, the audio processing system 500 can have any combination of the modules listed with any additional modules.

Source separation module 505 analyzes the audio component of the video to identify and isolate each sound source. This includes segmenting the sound sources to create separate audio for each sound source using one or more source separation techniques. For example, if the video is a talk show with two people having a conversation, the source separation module 505 would isolate the dialogue of each person. At this point, audio from each sound source includes sound that has reflected off walls or other objects in the local area of the video. The reflected sound is reverberation and, when the audio with reverberation is mixed into mono or stereo audio, the spatial information contained in the reflections is collapsed and lost.

Reverberation removal module 510 receives the audio for each sound source and removes reverberation from the to obtain a direct sound component for each sound source. The direct sound component is the sound that originates directly from the sound source and does not include any reverberation.

Local area characteristic module 515 obtains acoustic characteristics of the local area captured in the video to use in re-spatializing each audio source. As described above, there are a number of ways in which the local area characteristics module 515 may obtain the acoustic characteristics of the local area. For this reason, the local area characteristics module 515 further includes an audio analysis module 520 and a visual component analysis module 525.

Audio analysis module 520 of local area characteristics module 515 analyzes reverberation of the audio component to obtain sounds characteristics of the local area. In one embodiment, analyzing the reverberation includes calculating a reverberation time decay (e.g., using RT60 Estimation, etc.). With the reverberation time decay, the system can reverse engineer the acoustic characteristics of the local area. Thus, the local area characteristics module 515 obtains acoustic characteristics of the local area by reverse engineering the reverberation in the local area.

Figure 7:
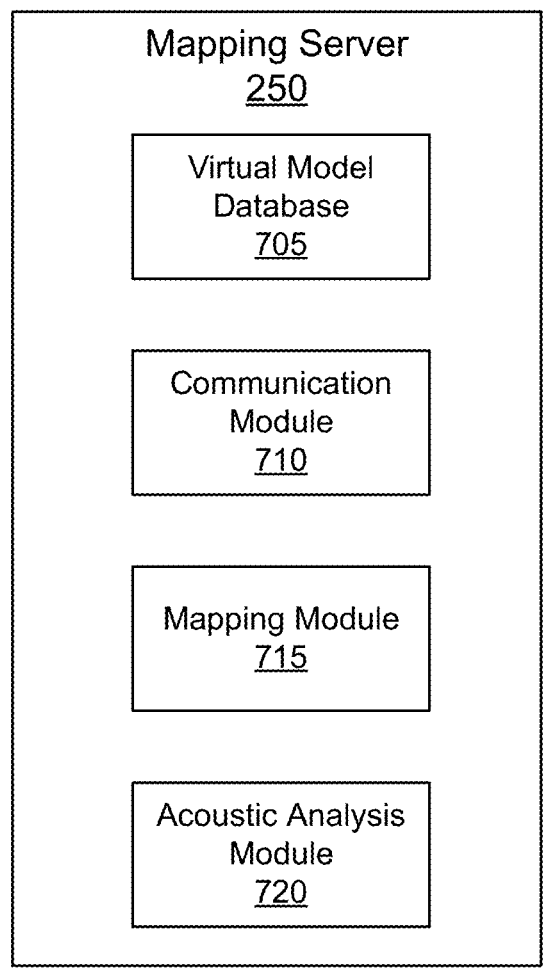
FIG. 7 is a block diagram of a mapping server, in accordance with one or more embodiments.

Visual component analysis module 525 of local area characteristics module 515, in one embodiment, identifies visual features from the visual component of the video and compares the visual features to features of spaces stored in a database of the mapping server 250, discussed with respect to FIG. 7. Responsive to identifying a match between the visual features of the local area and the features of the spaces stored in the database of the mapping server 250, the local area characteristics module obtains the acoustic characteristics of the space for use in re-spatializing each sound source in the video. Thus, in this embodiment, the local area characteristics module 515 obtains acoustic characteristics of the local area from the mapping server based on the match between the visual features of the local area and the features of the spaces stored in the database of the mapping server 250.

Visual component analysis module 525 of local area characteristics module 515, in another embodiment, identifies visual features from the visual component of the video to estimate the acoustic characteristics of the local area. In one embodiment, the local area characteristics module 515 correlates visual features in videos with known acoustic characteristics using a machine learning model. The machine learning model may also correlate audio features (e.g., reverberation time, sound attenuation, sound absorption, sound diffusion, etc.) to known acoustic characteristics. Accordingly, the machine learning model maps visual features and, in some embodiments, audio features of known environments in videos to their acoustic characteristics. This allows the local area characteristics module 515 to estimate the acoustic characteristics of a local area in a video that is not known based on the visual features and/or audio features from the video. Accordingly, in this embodiment, the local area characteristics module 515 obtains acoustic characteristics of the local area by estimating the acoustic characteristics based on the visual features of the local area in the video.

3-D audio generation module 530 re-spatializes the direct sound component of each sound source from the legacy video using the obtained acoustic characteristics to generate the 3-D audio. Using the acoustic characteristics, the 3-D audio generation module 530 generates a local area impulse response for each sound source so that the isolated audio associated with each sound source matches the acoustic characteristics of the local area captured in the video. This allows the sound to appear as if it is originating from its respective source in the local area.

Method for Deriving Spatialized Acoustic Data from Legacy Audiovisual Media

FIG. 6 is a flowchart illustrating a process 600 for deriving spatialized acoustic data from legacy audiovisual media, in accordance with one or more embodiments. The process 600 of FIG. 6 may be performed by the components of an apparatus, e.g., the mapping server 250 audio processing system 500. Other entities (e.g., components of the headset 800 or 805, mapping server 250 of FIG. 7, and/or components shown in FIG. 11) may perform some or all the steps of the process in other embodiments. Likewise, embodiments may include different and/or additional steps, or perform the steps in different orders.

The audio processing system 500 obtains 605 a video that includes a visual component and an audio component. The audio component is generated by a first sound source and a second sound source in the video. The audio component is flat two-dimensional audio originally mixed for mono or stereo audio and does not include any spatialization.

The audio processing system 500 segments 610 the audio component into a first audio for the first sound source and a second audio for the second sound source. Segmentation isolates the audio of each individual sound source within the video. The isolated audio of each individual sound source still contains sound reflections associated with each individual sound source.

The audio processing system 500 removes 615 reverberation from the first audio and the second audio to obtain a direct sound component of the first audio and the second audio free of sound reflections.

The audio processing system 500 obtains 620 acoustic characteristics of the local area. As described above, there are a number of methods by which the audio processing system 500 obtains 620 acoustic characteristics and these include 1) comparing visual features of the visual component of the video to features of spaces stored in a database of a mapping server, 2) analyzing reverberation of the audio component to obtain the acoustic characteristics of the local area, 3) analyzing the visual component of video to estimate the acoustic characteristics of the local area, and 4) a combination of analyzing the reverberation and analyzing the visual components to estimate the acoustic characteristics of the local area.

The audio processing system 500 generates 625 the 3-D audio for the video with the direct sound component of the first audio and the second audio using the acoustic characteristics of the local area. This includes generating a local area impulse response for each audio source so that the space characteristics of the audio match to the sound and/or space characteristics of the local area captured in the video. This allows the sound to appear as if it is originating from each of the actual sources in the local area.

Mapping Server Storing Virtual Models of Physical Spaces

FIG. 7 is a block diagram of the mapping server 250, in accordance with one or more embodiments. The mapping server 250 facilitates the generation of the 3-D audio. The mapping server 250 stores acoustic characteristics of spaces that the mapping server 250 receives from crowd-sourcing acoustic and/or spatial data from users wearing a headset with room/space mapping capabilities. The mapping server 250 includes a database that stores a virtual model describing a plurality of spaces and acoustic characteristics of those spaces. To facilitate this functionality, the mapping server 250 receives, from a number of headsets via a network, visual information describing at least a portion of many rooms located in many different locations. The mapping server 250 determines, based on the received visual information and/or location information, a location in the virtual model that is associated with a current configuration of a space (e.g., the local area). The mapping server 250 determines (e.g., retrieves) a set of acoustic characteristics associated with the current configuration of the space, based in part on the determined location in the virtual model and any acoustic characteristics associated with the determined location. The mapping server 250 may provide information about the set of acoustic characteristics to the audio processing system 500 (e.g., via the network) for generating the 3-D audio content at the audio processing system 500. In some embodiments, some of the components of the mapping server 250 may be integrated with another device (e.g., a console) connected to the headset via a wired connection (not shown in FIG. 6). Additional details regarding operations and components of the mapping server 250 are discussed below in connection with FIG. 7 and FIG. 10.

The mapping server 250 includes a virtual model database 705, a communication module 710, a mapping module 715, and an acoustic analysis module 720. In other embodiments, the mapping server 250 can have any combination of the modules listed with any additional modules. In some other embodiments, the mapping server 250 includes one or more modules that combine functions of the modules illustrated in FIG. 7. A processor of the mapping server 250 (not shown in FIG. 7) may run some or all of the virtual model database 705, the communication module 710, the mapping module 715, the acoustic analysis module 720, one or more other modules or modules combining functions of the modules shown in FIG. 7.

The virtual model database 705 stores a virtual model describing a plurality of physical spaces and acoustic characteristics of those physical spaces. Each location in the virtual model corresponds to a physical location mapped by one or more headsets within a local area having a specific configuration associated with a unique acoustic condition. The unique acoustic condition represents a condition of the local area having a unique set of acoustic characteristics represented with a unique set of acoustic characteristics. Each location in the virtual model is associated with a set of acoustic characteristics for a corresponding physical space that represents one configuration of the local area. The set of acoustic characteristics describes various acoustic characteristics of that one particular configuration of the local area. The physical spaces whose acoustic characteristics are described in the virtual model include, but are not limited to, a conference room, a bathroom, a hallway, an office, a bedroom, a dining room, and a living room. In some embodiments, the physical spaces can be certain outside spaces (e.g., patio, garden, etc.) or combination of various inside and outside spaces.

The communication module 710 is a module that communicates with headsets via a network. The communication module 710 receives, from the headsets, visual information describing at least the portion of the local areas that the headsets observe. In one or more embodiments, the visual information includes image data for at least the portion of the local areas. For example, the communication module 710 receives depth image data captured by a Depth Camera Assembly (DCA) of a headset with information about a shape of the local area defined by surfaces of the local area, such as surfaces of the walls, floor and ceiling of the space. The communication module 710 may also receive color image data captured by a Passive Camera Assembly (PCA) of the headset. The mapping server 250 may use the color image data to associate different acoustic materials with the surfaces of the local area. The communication module 710 may provide the visual information received from the headset (e.g., the depth image data and the color image data) to the mapping module 715.

The mapping module 715 maps the visual information received from the headset to a location of the virtual model. The mapping module 715 determines the location of the virtual model corresponding to a current physical space where the headset 710 is located, i.e., a current configuration of the local area. The mapping module 715 searches through the virtual model to find mapping between (i) the visual information that include at least e.g., information about geometry of surfaces of the physical space and information about acoustic materials of the surfaces and (ii) a corresponding configuration of the physical space within the virtual model. The mapping is performed by matching the geometry and/or acoustic materials information of the received visual information with geometry and/or acoustic materials information that is stored as part of the configuration of the physical space within the virtual model. The corresponding configuration of the physical space within the virtual model corresponds to a model of the physical space where the headset is currently located. If no matching is found, this is an indication that a current configuration of the physical space is not yet modeled within the virtual model. In such case, the mapping module 715 may inform the acoustic analysis module 720 that no matching is found, and the acoustic analysis module 720 determines a set of acoustic characteristics based at least in part on the received visual information.

The acoustic analysis module 720 determines the set of acoustic characteristics associated with the physical location of the headset, based in part on the determined location in the virtual model obtained from the mapping module 715 and any acoustic characteristics in the virtual model associated with the determined location. In some embodiments, the acoustic analysis module 720 retrieves the set of acoustic characteristics from the virtual model, as the set of acoustic characteristics are stored at the determined location in the virtual model that is associated with a specific space configuration. In some other embodiments, the acoustic analysis module 720 determines the set of acoustic characteristics by adjusting a previously determined set of acoustic characteristics for a specific space configuration in the virtual model, based at least in part on the visual information received from the headset. For example, the acoustic analysis module 720 may run off-line acoustic simulation using the received visual information to determine the set of acoustic characteristics.

In some embodiments, the acoustic analysis module 720 may perform acoustic simulations to generate spatially dependent pre-computed acoustic characteristics (e.g., a spatially dependent reverberation time, a spatially dependent direct to reverberant ratio, etc.). The spatially dependent pre-computed acoustic characteristics may be stored in appropriate locations of the virtual model at the virtual model database 705. The acoustic analysis module 720 may re-compute spatially dependent acoustic characteristics using the pre-computed acoustic characteristics whenever geometry and/or acoustic materials of a physical space change. The acoustic analysis module 720 may use various inputs for the acoustic simulations, such as but not limited to: information about a room geometry, acoustic material property estimates, and/or information about a human occupancy level (e.g., empty, partially full, full). The acoustic characteristics may be simulated for various occupancy levels, and various states of a room (e.g. open windows, closed windows, curtains open, curtains closed, etc.). If a state of the room changes, the mapping server 250 may determine and communicate to the headset an appropriate set of acoustic characteristics for presenting audio content to user. Otherwise, if the appropriate set of acoustic characteristics is not available, the mapping server 250 (e.g., via the acoustic analysis module 720) would calculate a new set of acoustic characteristics (e.g., via the acoustic simulations) and communicate the new set of acoustic characteristics to the headset.

In some embodiments, the mapping server 250 stores a full (measured or simulated) room impulse response for a given configuration of the local area. For example, the configuration of the local area may be based on a specific spatial arrangement of the headset and a sound source. The mapping server 250 may reduce the room impulse response into a set of acoustic characteristics suitable for a defined bandwidth of network transmission (e.g., a bandwidth of the network 720). The set of acoustic characteristics representing a parametrized version of a full impulse response may be stored, e.g., in the virtual model database 705 as part of the virtual mode, or in a separate non-transitory computer readable storage medium of the mapping server 250 (not shown in FIG. 7). The mapping server 250 and its functionality is further described in U.S. patent application Ser. No. 16/366,484, filed on Mar. 27, 2019, which is incorporated by reference in its entirety.

Example Headsets

Figure 8A:
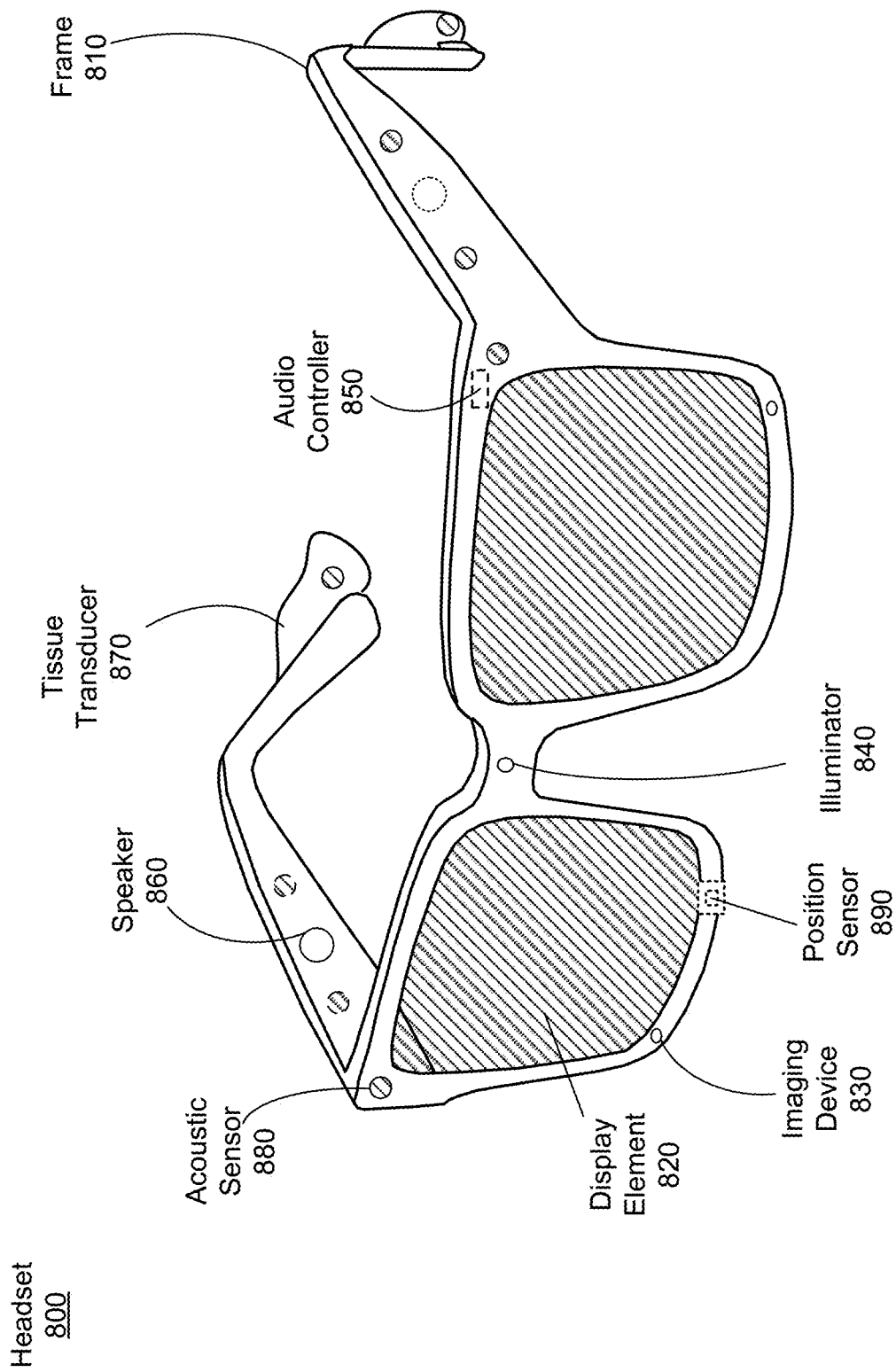
FIG. 8A is a perspective view of a headset implemented as an eyewear device, in accordance with one or more embodiments.

FIG. 8A is a perspective view of a headset 800 implemented as an eyewear device, in accordance with one or more embodiments. In some embodiments, the eyewear device is a near eye display (NED). In general, the headset 800 may be worn on the face of a user such that content (e.g., media content) is presented using a display assembly and/or an audio system. However, the headset 800 may also be used such that media content is presented to a user in a different manner. Examples of media content presented by the headset 800 include one or more images, video, audio, or some combination thereof. The headset 800 includes a frame, and may include, among other components, a display assembly including one or more display elements 820, a depth camera assembly (DCA), an audio system, and a position sensor 890. While FIG. 8A illustrates the components of the headset 800 in example locations on the headset 800, the components may be located elsewhere on the headset 800, on a peripheral device paired with the headset 800, or some combination thereof. Similarly, there may be more or fewer components on the headset 800 than what is shown in FIG. 8A.

The frame 810 holds the other components of the headset 800. The frame 810 includes a front part that holds the one or more display elements 820 and end pieces (e.g., temples) to attach to a head of the user. The front part of the frame 810 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 820 provide light to a user wearing the headset 800. As illustrated the headset includes a display element 820 for each eye of a user. In some embodiments, a display element 820 generates image light that is provided to an eyebox of the headset 800. The eyebox is a location in space that an eye of user occupies while wearing the headset 800. For example, a display element 820 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 800. In-coupling and/or outcoupling of light from the one or more waveguides may be done using one or more diffraction gratings.

In some embodiments, the waveguide display includes a scanning element (e.g., waveguide, mirror, etc.) that scans light from the light source as it is in-coupled into the one or more waveguides. Note that in some embodiments, one or both of the display elements 820 are opaque and do not transmit light from a local area around the headset 800. The local area is the area surrounding the headset 800. For example, the local area may be a room that a user wearing the headset 800 is inside, or the user wearing the headset 800 may be outside and the local area is an outside area. In this context, the headset 800 generates VR content. Alternatively, in some embodiments, one or both of the display elements 820 are at least partially transparent, such that light from the local area may be combined with light from the one or more display elements to produce AR and/or MR content.

In some embodiments, a display element 820 does not generate image light, and instead is a lens that transmits light from the local area to the eyebox. For example, one or both of the display elements 820 may be a lens without correction (non-prescription) or a prescription lens (e.g., single vision, bifocal and trifocal, or progressive) to help correct for defects in a user's eyesight. In some embodiments, the display element 820 may be polarized and/or tinted to protect the user's eyes from the sun.

Note that in some embodiments, the display element 820 may include an additional optics block (not shown). The optics block may include one or more optical elements (e.g., lens, Fresnel lens, etc.) that direct light from the display element 820 to the eyebox. The optics block may, e.g., correct for aberrations in some or all of the image content, magnify some or all of the image, or some combination thereof.

The DCA determines depth information for a portion of a local area surrounding the headset 800. The DCA includes one or more imaging devices 830 and a DCA controller (not shown in FIG. 8A), and may also include an illuminator 840. In some embodiments, the illuminator 840 illuminates a portion of the local area with light. The light may be, e.g., structured light (e.g., dot pattern, bars, etc.) in the infrared (IR), IR flash for time-of-flight, etc. In some embodiments, the one or more imaging devices 830 capture images of the portion of the local area that include the light from the illuminator 840. As illustrated, FIG. 8A shows a single illuminator 840 and two imaging devices 830. In alternate embodiments, there is no illuminator 840 and at least two imaging devices 830.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 840), some other technique to determine depth of a scene, or some combination thereof.

The audio system provides audio content. The audio system includes a transducer array, a sensor array, and an audio controller 850. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 860 or a tissue transducer 870 (e.g., a bone conduction transducer or a cartilage conduction transducer). Although the speakers 860 are shown exterior to the frame 810, the speakers 860 may be enclosed in the frame 810. In some embodiments, instead of individual speakers for each ear, the headset 800 includes a speaker array comprising multiple speakers integrated into the frame 810 to improve directionality of presented audio content. The tissue transducer 870 couples to the head of the user and directly vibrates tissue (e.g., bone or cartilage) of the user to generate sound. The number and/or locations of transducers may be different from what is shown in FIG. 8A.

The sensor array detects sounds within the local area of the headset 800. The sensor array includes a plurality of acoustic sensors 880. An acoustic sensor 880 captures sounds emitted from one or more sound sources in the local area (e.g., a room). Each acoustic sensor is configured to detect sound and convert the detected sound into an electronic format (analog or digital). The acoustic sensors 880 may be acoustic wave sensors, microphones, sound transducers, or similar sensors that are suitable for detecting sounds.

In some embodiments, one or more acoustic sensors 880 may be placed in an ear canal of each ear (e.g., acting as binaural microphones). In some embodiments, the acoustic sensors 880 may be placed on an exterior surface of the headset 800, placed on an interior surface of the headset 800, separate from the headset 800 (e.g., part of some other device), or some combination thereof. The number and/or locations of acoustic sensors 880 may be different from what is shown in FIG. 8A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 800.

The audio controller 850 processes information from the sensor array that describes sounds detected by the sensor array. The audio controller 850 may comprise a processor and a computer-readable storage medium. The audio controller 850 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 860, or some combination thereof.

The position sensor 890 generates one or more measurement signals in response to motion of the headset 800. The position sensor 890 may be located on a portion of the frame 810 of the headset 800. The position sensor 890 may include an inertial measurement unit (IMU). Examples of position sensor 890 include: one or more accelerometers, one or more gyroscopes, one or more magnetometers, another suitable type of sensor that detects motion, a type of sensor used for error correction of the IMU, or some combination thereof. The position sensor 890 may be located external to the IMU, internal to the IMU, or some combination thereof.

In some embodiments, the headset 800 may provide for simultaneous localization and mapping (SLAM) for a position of the headset 800 and updating of a model of the local area. For example, the headset 800 may include a passive camera assembly (PCA) that generates color image data. The PCA may include one or more RGB cameras that capture images of some or all of the local area. In some embodiments, some or all of the imaging devices 830 of the DCA may also function as the PCA. The images captured by the PCA and the depth information determined by the DCA may be used to determine parameters of the local area, generate a model of the local area, update a model of the local area, or some combination thereof. Furthermore, the position sensor 890 tracks the position (e.g., location and pose) of the headset 800 within the room. Additional details regarding the components of the headset 800 are discussed below in connection with FIGS. 9-11.

Figure 8B:
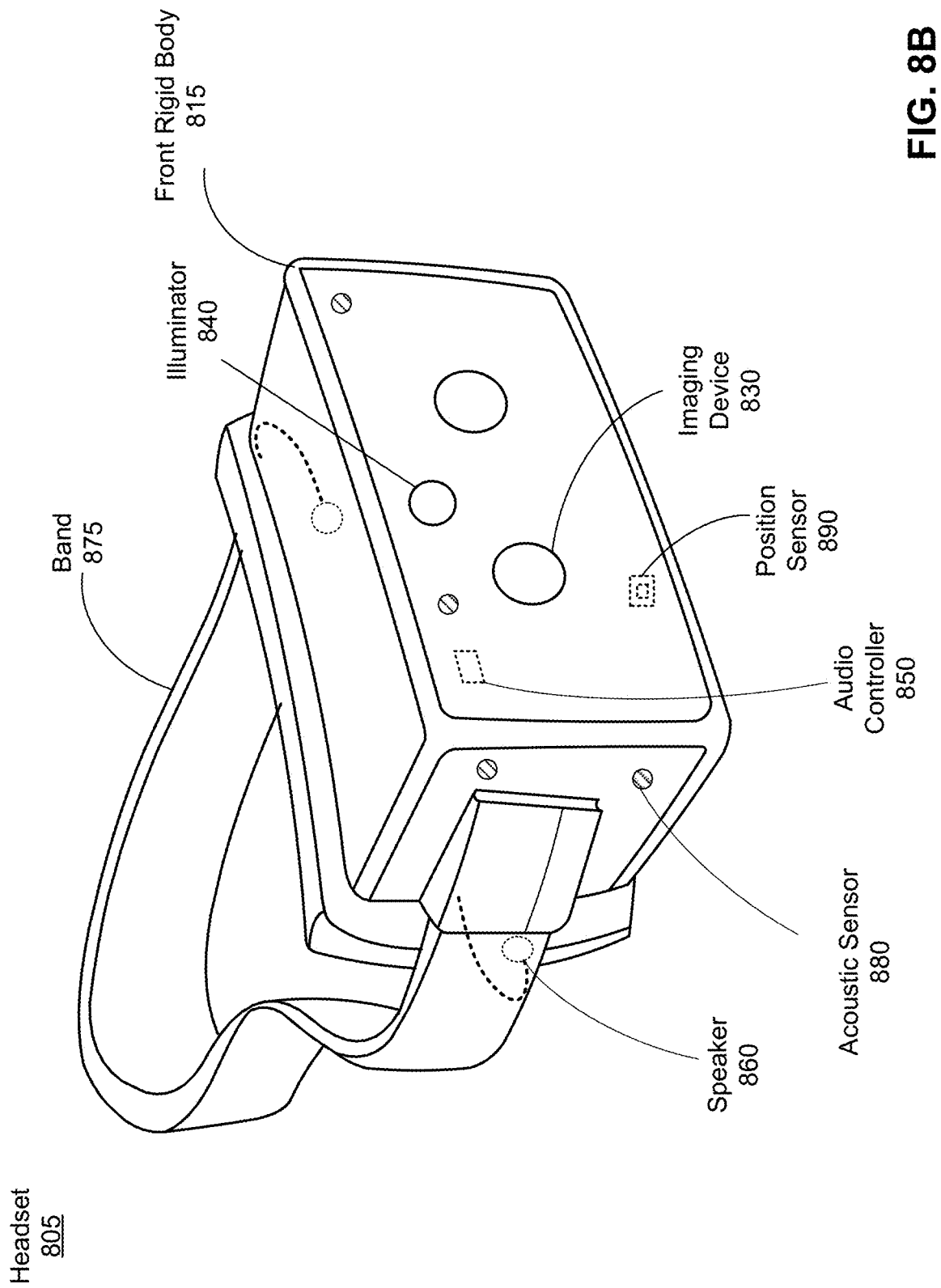
FIG. 8B is a perspective view of a headset implemented as a head-mounted display, in accordance with one or more embodiments.

FIG. 8B is a perspective view of a headset 805 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 815 and a band 875. The headset 805 includes many of the same components described above with reference to FIG. 8A, but modified to integrate with the HMD form factor. For example, the HMD includes a display assembly, a DCA, an audio system, and a position sensor 890. FIG. 8B shows the illuminator 840, a plurality of the speakers 860, a plurality of the imaging devices 830, a plurality of acoustic sensors 880, and the position sensor 890.

Headset Audio System

Figure 9:
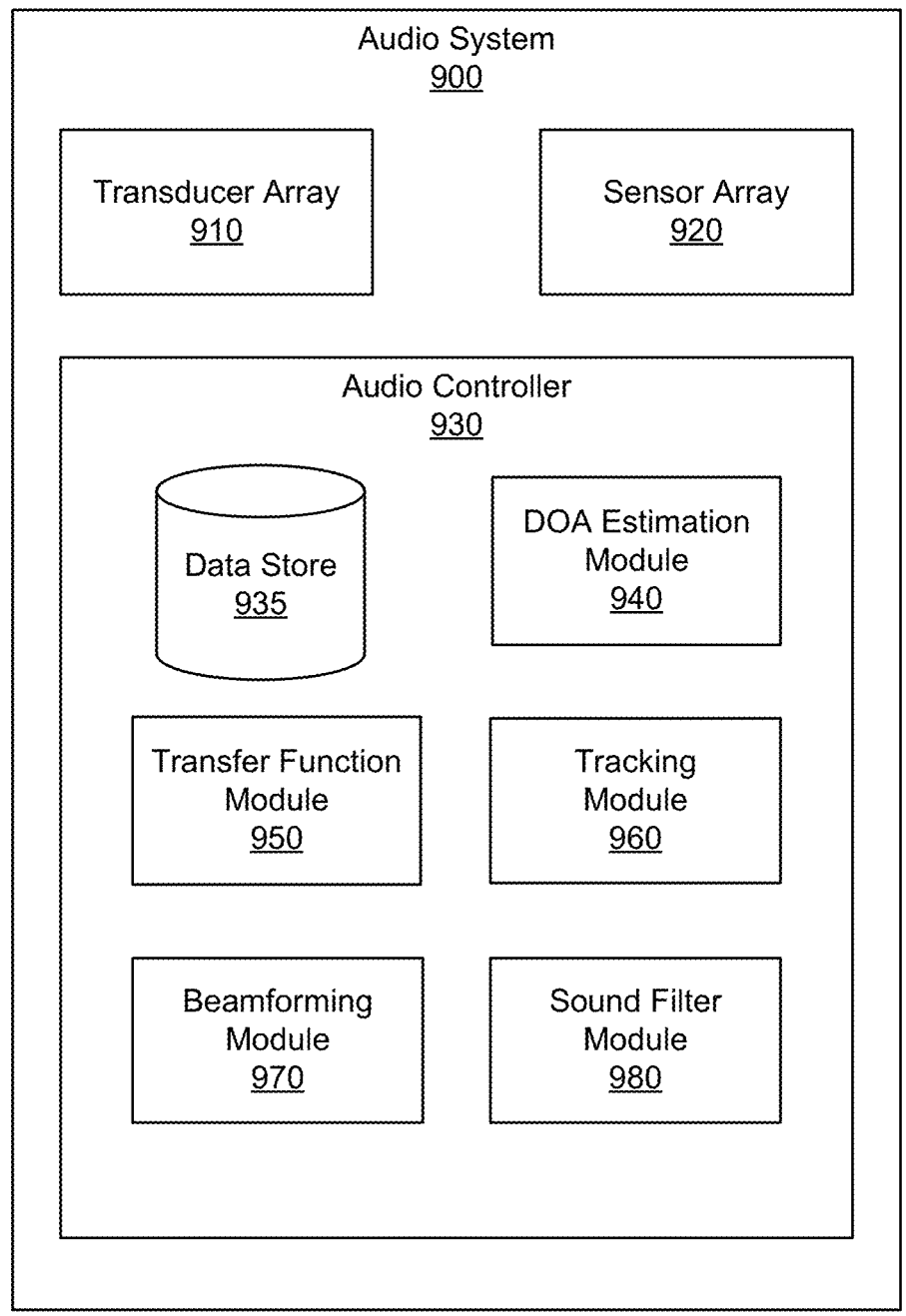
FIG. 9 is a block diagram of an audio system, in accordance with one or more embodiments.

FIG. 9 is a block diagram of an audio system 900, in accordance with one or more embodiments. The audio system in FIG. 8A or FIG. 8B may be an embodiment of the audio system 900. The audio system 900 generates one or more acoustic transfer functions for a user. The audio system 900 may then use the one or more acoustic transfer functions to generate audio content for the user. In the embodiment of FIG. 9, the audio system 900 includes a transducer array 910, a sensor array 920, and an audio controller 930. Some embodiments of the audio system 900 have different components than those described here. Similarly, in some cases, functions can be distributed among the components in a different manner than is described here.

The transducer array 910 is configured to present audio content. The transducer array 910 includes a plurality of transducers. A transducer is a device that provides audio content. A transducer may be, e.g., a speaker (e.g., the speaker 860), a tissue transducer (e.g., the tissue transducer 870), some other device that provides audio content, or some combination thereof. A tissue transducer may be configured to function as a bone conduction transducer or a cartilage conduction transducer. The transducer array 910 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 910 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 930, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 910 generates audio content in accordance with instructions from the audio controller 930. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 900. The transducer array 910 may be coupled to a wearable device (e.g., the headset 800 or the headset 805). In alternate embodiments, the transducer array 910 may be a plurality of speakers that are separate from the wearable device (e.g., coupled to an external console).

The sensor array 920 detects sounds within a local area surrounding the sensor array 920. The sensor array 920 may include a plurality of acoustic sensors that each detect air pressure variations of a sound wave and convert the detected sounds into an electronic format (analog or digital). The plurality of acoustic sensors may be positioned on a headset (e.g., headset 800 and/or the headset 805), on a user (e.g., in an ear canal of the user), on a neckband, or some combination thereof. An acoustic sensor may be, e.g., a microphone, a vibration sensor, an accelerometer, or any combination thereof. In some embodiments, the sensor array 920 is configured to monitor the audio content generated by the transducer array 910 using at least some of the plurality of acoustic sensors. Increasing the number of sensors may improve the accuracy of information (e.g., directionality) describing a sound field produced by the transducer array 910 and/or sound from the local area.

The audio controller 930 controls operation of the audio system 900. In the embodiment of FIG. 9, the audio controller 930 includes a data store 935, a DOA estimation module 940, a transfer function module 950, a tracking module 960, a beamforming module 970, and a sound filter module 980. The audio controller 930 may be located inside a headset, in some embodiments. Some embodiments of the audio controller 930 have different components than those described here. Similarly, functions can be distributed among the components in different manners than described here. For example, some functions of the controller may be performed external to the headset.

The data store 935 stores data for use by the audio system 900. Data in the data store 935 may include sounds recorded in the local area of the audio system 900, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 900, or any combination thereof.

The DOA estimation module 940 is configured to localize sound sources in the local area based in part on information from the sensor array 920. Localization is a process of determining where sound sources are located relative to the user of the audio system 900. The DOA estimation module 940 performs a DOA analysis to localize one or more sound sources within the local area. The DOA analysis may include analyzing the intensity, spectra, and/or arrival time of each sound at the sensor array 920 to determine the direction from which the sounds originated. In some cases, the DOA analysis may include any suitable algorithm for analyzing a surrounding acoustic environment in which the audio system 900 is located.

For example, the DOA analysis may be designed to receive input signals from the sensor array 920 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 920 received the direct-path audio signal. The determined angle may then be used to identify the DOA for the received input signal. Other algorithms not listed above may also be used alone or in combination with the above algorithms to determine DOA.

In some embodiments, the DOA estimation module 940 may also determine the DOA with respect to an absolute position of the audio system 900 within the local area. The position of the sensor array 920 may be received from an external system (e.g., some other component of a headset, an artificial reality console, a mapping server, a position sensor (e.g., the position sensor 890), etc.). The external system may create a virtual model of the local area, in which the local area and the position of the audio system 900 are mapped. The received position information may include a location and/or an orientation of some or all of the audio system 900 (e.g., of the sensor array 920). The DOA estimation module 940 may update the estimated DOA based on the received position information.

The transfer function module 950 is configured to generate one or more acoustic transfer functions. Generally, a transfer function is a mathematical function giving a corresponding output value for each possible input value. Based on parameters of the detected sounds, the transfer function module 950 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound sounds and the corresponding sound received by the acoustic sensors in the sensor array 920. Accordingly, for a sound source there is a corresponding transfer function for each of the acoustic sensors in the sensor array 920. And collectively the set of transfer functions is referred to as an ATF. Accordingly, for each sound source there is a corresponding ATF. Note that the sound source may be, e.g., someone or something generating sound in the local area, the user, or one or more transducers of the transducer array 910. The ATF for a particular sound source location relative to the sensor array 920 may differ from user to user due to a person's anatomy (e.g., ear shape, shoulders, etc.) that affects the sound as it travels to the person's ears. Accordingly, the ATFs of the sensor array 920 are personalized for each user of the audio system 900.

In some embodiments, the transfer function module 950 determines one or more HRTFs for a user of the audio system 900. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 950 may determine HRTFs for the user using a calibration process. In some embodiments, the transfer function module 950 may provide information about the user to a remote system. The remote system determines a set of HRTFs that are customized to the user using, e.g., machine learning, and provides the customized set of HRTFs to the audio system 900.

The tracking module 960 is configured to track locations of one or more sound sources. The tracking module 960 may compare current DOA estimates and compare them with a stored history of previous DOA estimates. In some embodiments, the audio system 900 may recalculate DOA estimates on a periodic schedule, such as once per second, or once per millisecond. The tracking module may compare the current DOA estimates with previous DOA estimates, and in response to a change in a DOA estimate for a sound source, the tracking module 960 may determine that the sound source moved. In some embodiments, the tracking module 960 may detect a change in location based on visual information received from the headset or some other external source. The tracking module 960 may track the movement of one or more sound sources over time. The tracking module 960 may store values for a number of sound sources and a location of each sound source at each point in time. In response to a change in a value of the number or locations of the sound sources, the tracking module 960 may determine that a sound source moved. The tracking module 960 may calculate an estimate of the localization variance. The localization variance may be used as a confidence level for each determination of a change in movement.

The beamforming module 970 is configured to process one or more ATFs to selectively emphasize sounds from sound sources within a certain area while de-emphasizing sounds from other areas. In analyzing sounds detected by the sensor array 920, the beamforming module 970 may combine information from different acoustic sensors to emphasize sound associated from a particular region of the local area while deemphasizing sound that is from outside of the region. The beamforming module 970 may isolate an audio signal associated with sound from a particular sound source from other sound sources in the local area based on, e.g., different DOA estimates from the DOA estimation module 940 and the tracking module 960. The beamforming module 970 may thus selectively analyze discrete sound sources in the local area. In some embodiments, the beamforming module 970 may enhance a signal from a sound source. For example, the beamforming module 970 may apply sound filters which eliminate signals above, below, or between certain frequencies. Signal enhancement acts to enhance sounds associated with a given identified sound source relative to other sounds detected by the sensor array 920.

The sound filter module 980 determines sound filters for the transducer array 910. In some embodiments, the sound filters cause the audio content to be spatialized, such that the audio content appears to originate from a target region. The sound filter module 980 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 980 calculates one or more of the acoustic parameters. In some embodiments, the sound filter module 980 requests the acoustic parameters from a mapping server (e.g., as described in FIG. 7).

The sound filter module 980 provides the sound filters to the transducer array 910. In some embodiments, the sound filters may cause positive or negative amplification of sounds as a function of frequency.

System Environment

Figure 10:
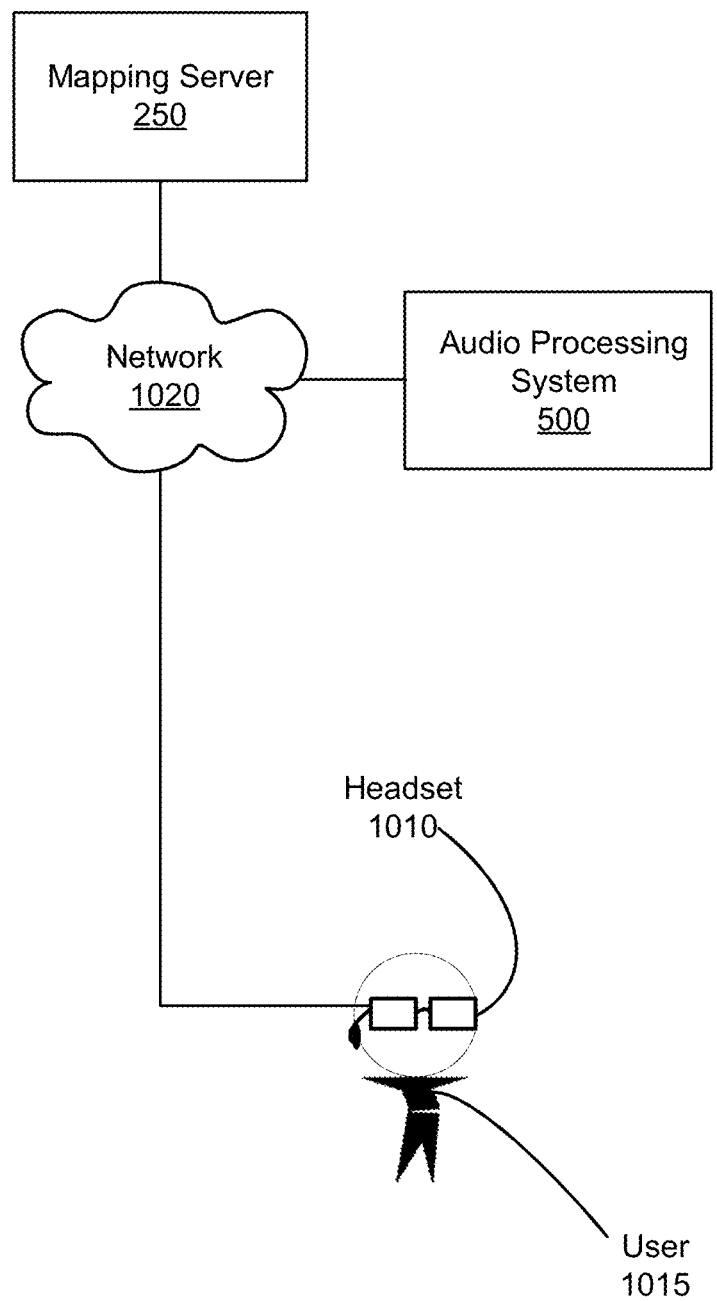
FIG. 10 a block diagram of a system environment that includes a headset, a mapping server, and an audio processing system, in accordance with one or more embodiments.

FIG. 10 is a block diagram of a system environment 1000 that includes a headset 1010, the mapping server 250, and the audio processing system 500, in accordance with one or more embodiments. The system 1000 includes the headset 1010 that can be worn by a user 1015. The headset 1010 is connected to the mapping server 250 and the audio processing system 500 via a network 1020. In some embodiments, the audio processing system 500 is part of the mapping server 250 or vice versa.

The network 1020 connects the headset 1010, the mapping server 250, and the audio processing system 500. The network 1020 may include any combination of local area and/or wide area networks using both wireless and/or wired communication systems. For example, the network 1020 may include the Internet, as well as mobile telephone networks. In one embodiment, the network 1020 uses standard communications technologies and/or protocols. Hence, the network 1020 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1020 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1020 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The network 1020 may also connect multiple headsets located in the same or different rooms to the same mapping server 250 and audio processing system 500.

The headset 1010 presents media to a user. In one embodiment, the headset 1010 may be a NED, such as headset 800 shown in FIG. 8A. In another embodiment, the headset 1010 may be a HMD, such as headset 805 shown in FIG. 8B. In general, the headset 1010 may be worn on the face of a user such that content (e.g., media content) is presented using one or both lens of the headset. However, the headset 1010 may also be used such that media content is presented to a user in a different manner. Examples of media content presented by the headset 1010 include one or more images, video, audio, or some combination thereof.

The audio processing system 500 generates 3-D audio from legacy videos. The legacy videos can be presented to the user 1015 via the headset 1010 who can view the video with 3-D spatialized audio. The audio processing system 500 may provide the 3-D spatialized audio directly to the headset 1010 via the network 1020 or through another entity.

Figure 11:
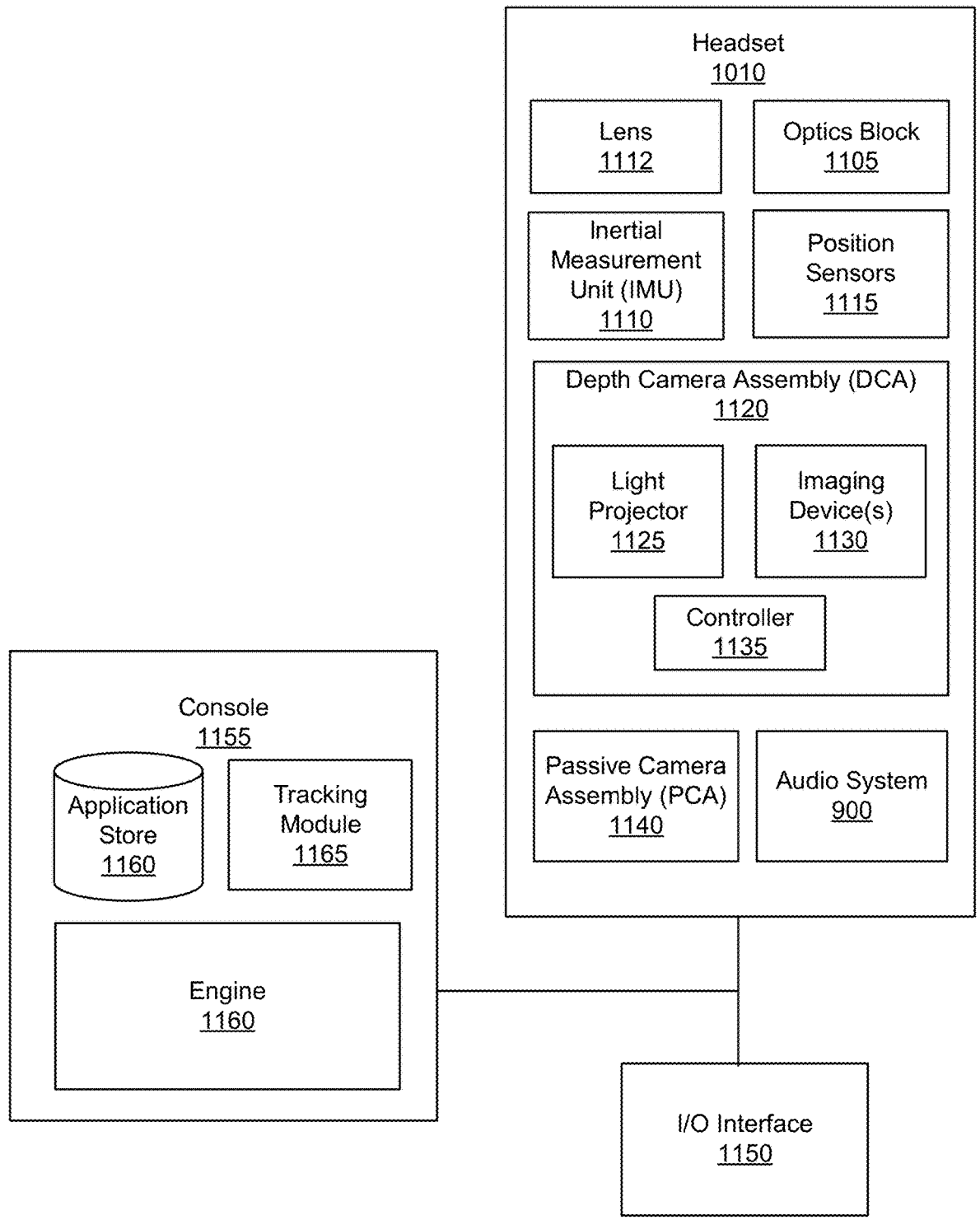
FIG. 11 is a block diagram of a headset, in accordance with one or more embodiments.

FIG. 11 is a system 1100 of a headset 1010, in accordance with one or more embodiments. The system 1100 may operate in an artificial reality environment, e.g., a virtual reality, an augmented reality, a mixed reality environment, or some combination thereof. The system 1100 shown by FIG. 11 includes the headset 1010, the mapping server 250 and an input/output (I/O) interface 1150 that is coupled to a console 1155. While FIG. 11 shows an example system 1100 including one headset 1010 and one I/O interface 1150, in other embodiments any number of these components may be included in the system 1100. For example, there may be multiple headsets 1010 each having an associated I/O interface 1150, with each headset 1010 and I/O interface 1150 communicating with the console 1155. In alternative configurations, different and/or additional components may be included in the system 1100. Additionally, functionality described in conjunction with one or more of the components shown in FIG. 11 may be distributed among the components in a different manner than described in conjunction with FIG. 11 in some embodiments. For example, some or all of the functionality of the console 1155 may be provided by the headset 1010.

The headset 1010 includes the lens 1112, an optics block 1105, one or more position sensors 1115, the DCA 1120, an inertial measurement unit (IMU) 1110, the PCA 1140, and the audio system 1145. Some embodiments of headset 1010 have different components than those described in conjunction with FIG. 11. Additionally, the functionality provided by various components described in conjunction with FIG. 11 may be differently distributed among the components of the headset 1010 in other embodiments, or be captured in separate assemblies remote from the headset 1010.

The lens 1112 may include an electronic display that displays 2D or 3D images to the user in accordance with data received from the console 1155. In various embodiments, the lens 1112 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof.

The optics block 1105 magnifies image light received from the electronic display, corrects optical errors associated with the image light, and presents the corrected image light to a user of the headset 1010. In various embodiments, the optics block 1105 includes one or more optical elements. Example optical elements included in the optics block 1105 include: an aperture, a Fresnel lens, a convex lens, a concave lens, a filter, a reflecting surface, or any other suitable optical element that affects image light. Moreover, the optics block 1105 may include combinations of different optical elements. In some embodiments, one or more of the optical elements in the optics block 1105 may have one or more coatings, such as partially reflective or anti-reflective coatings.

Magnification and focusing of the image light by the optics block 1105 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 90 degrees diagonal), and in some cases all, of the user's field of view. Additionally, in some embodiments, the amount of magnification may be adjusted by adding or removing optical elements.

In some embodiments, the optics block 1105 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1105 corrects the distortion when it receives image light from the electronic display generated based on the content.

The IMU 1110 is an electronic device that generates data indicating a position of the headset 1010 based on measurement signals received from one or more of the position sensors 1115. A position sensor 1040 generates one or more measurement signals in response to motion of the headset 1010. Examples of position sensors 1115 include: one or more accelerometers, one or more gyroscopes, one or more magnetometers, another suitable type of sensor that detects motion, a type of sensor used for error correction of the IMU 1110, or some combination thereof. The position sensors 1115 may be located external to the IMU 1110, internal to the IMU 1110, or some combination thereof.

The DCA 1120 generates depth image data of a local area, such as a room. Depth image data includes pixel values defining distance from the imaging device, and thus provides a (e.g., 3D) mapping of locations captured in the depth image data. The DCA 1120 includes a light projector 1125, one or more imaging devices 1130, and a controller 1135. The light projector 1125 may project a structured light pattern or other light that is reflected off objects in the local area, and captured by the imaging device 625 to generate the depth image data.

For example, the light projector 1125 may project a plurality of structured light (SL) elements of different types (e.g. lines, grids, or dots) onto a portion of a local area surrounding the headset 1010. In various embodiments, the light projector 1125 comprises an emitter and a pattern plate. The emitter is configured to illuminate the pattern plate with light (e.g., infrared light). The illuminated pattern plate projects a SL pattern comprising a plurality of SL elements into the local area. For example, each of the SL elements projected by the illuminated pattern plate is a dot associated with a particular location on the pattern plate.

Each SL element projected by the DCA 1120 comprises light in the infrared light part of the electromagnetic spectrum. In some embodiments, the illumination source is a laser configured to illuminate a pattern plate with infrared light such that it is invisible to a human. In some embodiments, the illumination source may be pulsed. In some embodiments, the illumination source may be visible and pulsed such that the light is not visible to the eye.

The SL pattern projected into the local area by the DCA 1120 deforms as it encounters various surfaces and objects in the local area. The one or more imaging devices 1130 are each configured to capture one or more images of the local area. Each of the one or more images captured may include a plurality of SL elements (e.g., dots) projected by the light projector 1125 and reflected by the objects in the local area. Each of the one or more imaging devices 1130 may be a detector array, a camera, or a video camera.

The controller 1135 generates the depth image data based on light captured by the imaging device 625. The controller 1135 may further provide the depth image data to the console 1155, the audio controller 1020, or some other component.

The PCA 1140 includes one or more passive cameras that generate color (e.g., RGB) image data. Unlike the DCA 1120 that uses active light emission and reflection, the PCA 1140 captures light from the environment of a local area to generate image data. Rather than pixel values defining depth or distance from the imaging device, the pixel values of the image data may define the visible color of objects captured in the imaging data. In some embodiments, the PCA 1140 includes a controller that generates the color image data based on light captured by the passive imaging device. In some embodiments, the DCA 1120 and the PCA 1140 share a common controller. For example, the common controller may map each of the one or more images captured in the visible spectrum (e.g., image data) and in the infrared spectrum (e.g., depth image data) to each other. In one or more embodiments, the common controller is configured to, additionally or alternatively, provide the one or more images of the local area to the audio controller 1020 or the console 1155.

The audio system 900 presents audio content to a user of the headset 1010 using a set of acoustic characteristics representing an acoustic property of a local area where the headset 1010 is located. The audio system 900 presents the audio content to appear originating from an object (e.g., virtual object or real object) within the local area. The audio system 900 may obtain information describing at least a portion of the local area. The audio system 900 may communicate the information to the mapping server 250 for determination of the set of acoustic characteristics at the mapping server 250. The audio system 900 may also receive the set of acoustic characteristics from the mapping server 250.

In some embodiments, the audio system 900 selectively extrapolates the set of acoustic characteristics into an adjusted set of acoustic characteristics representing a reconstructed impulse response for a specific configuration of the local area, responsive to a change of an acoustic condition of the local area being above a threshold change. The audio system 900 may present audio content to the user of the headset 1010 based at least in part on the reconstructed impulse response.

In some embodiments, the audio system 900 monitors sound in the local area and generates a corresponding audio stream. The audio system 900 may adjust the set of acoustic characteristics, based at least in part on the audio stream. The audio system 900 may also selectively communicate the audio stream to the mapping server 250 for updating a virtual model describing a variety of physical spaces and acoustic properties of those spaces, responsive to determination that a change of an acoustic property of the local area over time is above a threshold change. The audio system 900 of the headset 1010 and the mapping server 250 may communicate via a wired or wireless communication link (e.g., the network 620 of FIG. 10).

The I/O interface 1150 is a device that allows a user to send action requests and receive responses from the console 1155. An action request is a request to perform a particular action. For example, an action request may be an instruction to start or end capture of image or video data, or an instruction to perform a particular action within an application. The I/O interface 1150 may include one or more input devices. Example input devices include: a keyboard, a mouse, a game controller, or any other suitable device for receiving action requests and communicating the action requests to the console 1155. An action request received by the I/O interface 1150 is communicated to the console 1155, which performs an action corresponding to the action request. In some embodiments, the I/O interface 1150 includes the IMU 1110, as further described above, that captures calibration data indicating an estimated position of the I/O interface 1150 relative to an initial position of the I/O interface 1150. In some embodiments, the I/O interface 1150 may provide haptic feedback to the user in accordance with instructions received from the console 1155. For example, haptic feedback is provided when an action request is received, or the console 1155 communicates instructions to the I/O interface 1150 causing the I/O interface 1150 to generate haptic feedback when the console 1155 performs an action.

The console 1155 provides content to the headset 1010 for processing in accordance with information received from one or more of: the DCA 1120, the PCA 1140, the headset 1010, and the I/O interface 1150. In the example shown in FIG. 11, the console 1155 includes an application store 1160, a tracking module 1165, and an engine 1170. Some embodiments of the console 1155 have different modules or components than those described in conjunction with FIG. 11. Similarly, the functions further described below may be distributed among components of the console 1155 in a different manner than described in conjunction with FIG. 11. In some embodiments, the functionality discussed herein with respect to the console 1155 may be implemented in the headset 1010, or a remote system.

The application store 1160 stores one or more applications for execution by the console 1155. An application is a group of instructions, that when executed by a processor, generates content for presentation to the user. Content generated by an application may be in response to inputs received from the user via movement of the headset 1010 or the I/O interface 1150. Examples of applications include: gaming applications, conferencing applications, video playback applications, or other suitable applications.

The tracking module 1165 calibrates the local area of the system 1100 using one or more calibration parameters and may adjust one or more calibration parameters to reduce error in determination of the position of the headset 1010 or of the I/O interface 1150. For example, the tracking module 1165 communicates a calibration parameter to the DCA 1120 to adjust the focus of the DCA 1120 to more accurately determine positions of SL elements captured by the DCA 1120. Calibration performed by the tracking module 1165 also accounts for information received from the IMU 1110 in the headset 1010 and/or an IMU 1110 included in the I/O interface 1150. Additionally, if tracking of the headset 1010 is lost (e.g., the DCA 1120 loses line of sight of at least a threshold number of the projected SL elements), the tracking module 1165 may re-calibrate some or all of the system 1100.

The tracking module 1165 tracks movements of the headset 1010 or of the I/O interface 1150 using information from the DCA 1120, the PCA 1140, the one or more position sensors 1115, the IMU 1110 or some combination thereof. For example, the tracking module 1165 determines a position of a reference point of the headset 1010 in a mapping of a local area based on information from the headset 1010. The tracking module 1165 may also determine positions of an object or virtual object. Additionally, in some embodiments, the tracking module 1165 may use portions of data indicating a position of the headset 1010 from the IMU 1110 as well as representations of the local area from the DCA 1120 to predict a future location of the headset 1010. The tracking module 1165 provides the estimated or predicted future position of the headset 1010 or the I/O interface 1150 to the engine 1170.

The engine 1170 executes applications and receives position information, acceleration information, velocity information, predicted future positions, or some combination thereof, of the headset 1010 from the tracking module 1165. Based on the received information, the engine 1170 determines content to provide to the headset 1010 for presentation to the user. For example, if the received information indicates that the user has looked to the left, the engine 1170 generates content for the headset 1010 that mirrors the user's movement in a virtual local area or in a local area augmenting the local area with additional content. Additionally, the engine 1170 performs an action within an application executing on the console 1155 in response to an action request received from the I/O interface 1150 and provides feedback to the user that the action was performed. The provided feedback may be visual or audible feedback via the headset 1010 or haptic feedback via the I/O interface 1150.

Additional Configuration Information

Embodiments according to the invention are in particular disclosed in the attached claims directed to a method, an apparatus, and a storage medium, wherein any feature mentioned in one claim category, e.g. method, can be claimed in another claim category, e.g. apparatus, storage medium, system, and computer program product, as well. The dependencies or references back in the attached claims are chosen for formal reasons only. However, any subject matter resulting from a deliberate reference back to any previous claims (in particular, multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   segmenting, by an audio processing system, an audio component of a video into first audio for a first sound source in the video and second audio for a second sound source in the video, wherein the audio component is two-dimensional audio;
   removing reverberation from the first audio and the second audio to obtain a direct sound component of the first audio and the second audio;
   obtaining, for a local area associated with the video, acoustic characteristics of the local area; and
   generating, by the audio processing system, three-dimensional audio for the video with the direct sound component of the first audio and the second audio using the acoustic characteristics of the local area.

2. The method of claim 1, wherein obtaining acoustic characteristics of the local area comprises:
   identifying, from a visual component of the video, visual features of the local area;
   comparing the identified visual features of the local area to visual features of real-world spaces stored in a database, the database including a mapping of visual features of the real-world spaces to acoustic characteristics of the real-world spaces; and
   responsive to the identified visual features matching visual features of a real-world space stored in the database, using the acoustic characteristics of the real-world space to generate the three-dimensional audio of the first audio and the second audio.

3. The method of claim 1, wherein obtaining acoustic characteristics of the local area comprises:
   analyzing a visual component of the video to identify visual features of the local area; and
   estimating the acoustic characteristics of the local area based on the visual features of the local area.

4. The method of claim 3, wherein estimating the acoustic characteristics of the local area based on the visual features of the local area includes:
   applying, to the visual features of the local area, a machine learning model that correlates visual features of known spaces to acoustic characteristics of the known spaces.

5. The method of claim 1, wherein obtaining acoustic characteristics of the local area further comprises:
   analyzing the audio component to identify reverberation of the first audio and the second audio; and
   determining the acoustic characteristics of the local area from the reverberation of the first audio and the second audio.

6. The method of claim 1, wherein generating the three-dimensional audio comprises:
   generating a local area impulse response for the first sound source and the second sound source to match the first audio and the second audio to the acoustic characteristics of the local area captured in the video.

7. The method of claim 6, further comprising:
   obtaining, from a headset worn by a user, data for at least one of position or orientation of the headset, the at least one of position or orientation corresponding to a viewing perspective of the user with respect to the video; and
   adjusting the local area impulse response for the first sound source and the second sound source based on the data for the at least one of position or orientation of the headset and the acoustic characteristics of the local area captured in the video.

8. The method of claim 1, wherein generating the three-dimensional audio for the video further comprises:
   combining, using binaural synthesis, an impulse response for each of the first sound source and the second sound source.

9. The method of claim 1, wherein generating the three-dimensional audio for the video causes the first audio to be perceived by the user as originating from a first object within the local area and the second audio to be perceived by the user as originating from a second object within the local area.

10. A method comprising:
    obtaining a video that includes a visual component and an audio component, wherein the audio component is two-dimensional audio;
    identifying, from the audio component, a sound source;
    removing reverberation from the audio component to obtain a direct sound component of the two-dimensional audio;

obtaining, for a local area associated with the video, acoustic characteristics of the local area; and generating three-dimensional audio for the video with the direct sound component of the two-dimensional audio using the acoustic characteristics of the local area.

11. The method of claim 10, wherein generating the three-dimensional audio comprises:

generating a local area impulse response for the sound source to match the audio component to the acoustic characteristics of the local area captured in the video.

12. The method of claim 10, wherein obtaining acoustic characteristics of the local area comprises:

identifying, from the visual component, visual features of the local area;

comparing the identified visual features of the local area to visual features of real-world spaces stored in a database, the database including a mapping of visual features of the real-world spaces to acoustic characteristics of the real-world spaces; and responsive to the identified visual features matching visual features of a real-world space stored in the database, using the acoustic characteristics of the real-world space to generate the three-dimensional audio of the audio component.

13. The method of claim 10, wherein obtaining acoustic characteristics of the local area comprises:

analyzing the visual component to identify visual features of the local area; and estimating the acoustic characteristics of the local area by applying, to the visual features of the local area, a machine learning model that correlates visual features of known spaces to acoustic characteristics of the known spaces.

14. The method of claim 10, wherein obtaining acoustic characteristics of the local area further comprises:

analyzing the audio component to identify reverberation of the audio component; and determining the acoustic characteristics of the local area from the reverberation of the audio component.

15. A non-transitory computer-readable storage medium comprising instructions that, when executed by a processor, cause the processor to:

segment audio of a video into first audio for a first sound source and second audio for a second sound source in the video, wherein the audio is two-dimensional mono or stereo audio;

remove reverberation from the first audio and the second audio to obtain a direct sound component of the first audio and the second audio;

obtain, for a local area associated with the video, acoustic characteristics of the local area; and generate three-dimensional audio for the video with the direct sound component of the first audio and the second audio using the acoustic characteristics of the local area associated with the video, wherein the three-dimensional audio causes the first sound source to appear originating from a first object within the local area and the second sound source to appear originating from a second object within the local area.

16. The non-transitory computer-readable storage medium of claim 15, wherein generating the three-dimensional audio comprises:

generating a local area impulse response for the first sound source and the second sound source to match the first audio and the second audio to the acoustic characteristics of the local area captured in the video.

17. The non-transitory computer-readable storage medium of claim 16, wherein the instructions that, when executed by the processor, further cause the processor to:

obtain, from a headset worn by a user, data for at least one of position or orientation of the headset, the at least one of position or orientation corresponding to a perspective of the user viewing content in the video; and adjust the local area impulse response for the first sound source and the second sound source based on the data for the at least one of position or orientation of the headset and the acoustic characteristics of the local area captured in the video.

18. The non-transitory computer-readable storage medium of claim 15, wherein obtaining acoustic characteristics of the local area further comprises:

identifying visual characteristics of the local area;

comparing the identified visual characteristics of the local area to visual characteristics of real-world spaces stored in a database; and responsive to the identified visual characteristics matching visual characteristics of a real-world space stored in the database, using the acoustic characteristics of the real-world space stored in the database to generate three-dimensional audio for the video.

19. The non-transitory computer-readable storage medium of claim 15, wherein obtaining acoustic characteristics of the local area further comprises:

analyzing visual characteristics of the local area; and estimating the space characteristics of the local area based on the visual characteristics of the local area.

20. The non-transitory computer-readable storage medium of claim 15, wherein obtaining acoustic characteristics of the local area further comprises:

identifying reverberation of the first sound source and the second sound source; and identifying the acoustic characteristics of the local area from the identified reverberation.

* * * * *

UNITED STATES PATENT AND TRADEMARK OFFICE
CERTIFICATE OF CORRECTION

PATENT NO. : 10,721,521 B1
APPLICATION NO. : 16/450688
DATED : July 21, 2020
INVENTOR(S) : Philip Robinson et al.

Page 1 of 1

It is certified that error appears in the above-identified patent and that said Letters Patent is hereby corrected as shown below:

On the Title Page

Item (72), Column 1, in "Inventors", Line 2, delete "Vicenç" and insert -- Vicenç --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*